Figure 1:
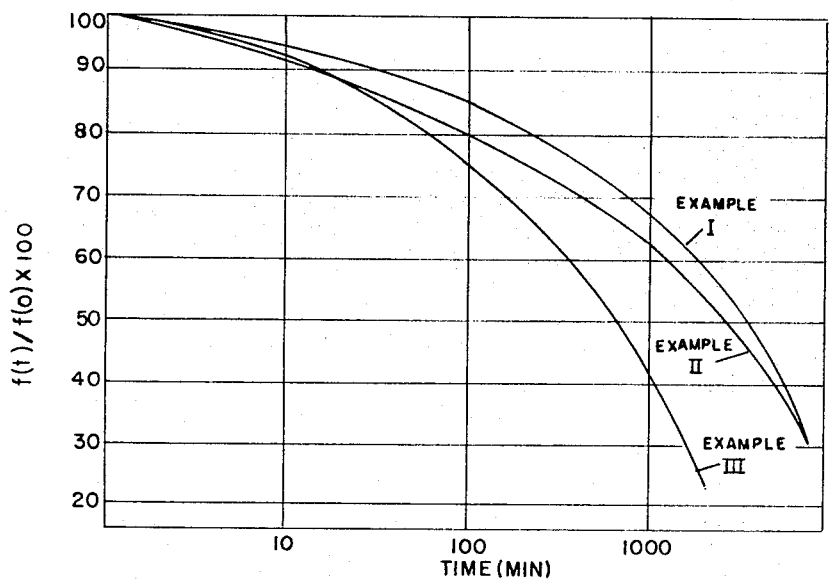

United States Patent [11] 3,622,547

[72] Inventor Nicholas P. Ermidis
 West New York, N.J.
[21] Appl. No. 872,010
[22] Filed Oct. 29, 1969
[45] Patented Nov. 23, 1971
[73] Assignee American Cyanamid Company
 Stamford, Conn.

[54] VULCANIZATION SYSTEM FOR ACRYLATE ELASTOMERS (TRITHIOCYANURIC ACID AND DITHIOCARBAMIC ACID DERIVATIVES)
 9 Claims, 1 Drawing Fig.
[52] U.S. Cl. .................................................... 260/79.5 P,
 260/2 EC, 260/86.1, 260/86.3, 260/791, 260/793
[51] Int. Cl. ........................................................ C08f 27/06
[50] Field of Search .......................................... 260/79.5,
 86.1, 248, 791, 793

[56] References Cited
UNITED STATES PATENTS
| | | | |
|---|---|---|---|
| 3,366,598 | 1/1968 | Westlinning.................. | 260/41.5 |
| 3,431,245 | 3/1969 | Scherf.......................... | 260/79.5 |
| 3,448,112 | 6/1969 | De Acetis..................... | 260/294.8 |
| 3,450,681 | 6/1969 | Gobran ........................ | 260/80.72 |

Primary Examiner—Joseph L. Schofer
Assistant Examiner—C. A. Henderson, Jr.
Attorney—Philip Mintz ABSTRACT: A vulcanizable acrylic elastomer composition having chlorine or epoxy groups contains as a vulcanization system trithiocyanuric acid and a dithiocarbamic acid derivative. 2,2'-dithio-bis(benzothiazole) is included when maximum scorch protection is desired.

INVENTOR
NICHOLAS P. ERMIDIS
BY Philip Mintz
ATTORNEY

VULCANIZATION SYSTEM FOR ACRYLATE ELASTOMERS (TRITHIOCYANURIC ACID AND DITHIOCARBAMIC ACID DERIVATIVES)

This invention relates generally to acrylic elastomers and, more particularly, to a vulcanizable composition containing an acrylic elastomer having active-halogen or epoxy groups.

Acrylic elastomers have many properties including good heat stability which make them desirable for making various rubberlike products such as, for example, gaskets, hose, conveyor belts, valve seats, packings, oil seals and the like. However, acrylic elastomers are difficult to vulcanize even when they contain vulcanization sites such as active-halogen or epoxy groups. It has been proposed to use an amine, an ammonium salt or an organic peroxide for vulcanizing acrylic elastomers of this type but such vulcanizing systems have had some disadvantage such as slow cure rate, poor curing, or poor aging properties. A soap and sulfur mixture has also been proposed and while it is very suitable for many purposes, it cannot be used to advantage where a fast cure rate with maximum state of cure is required.

It is an object of this invention to provide a novel vulcanizable acrylic elastomer based composition having an improved cure rate. Another object of the invention is to provide a vulcanizable composition containing an acrylic elastomer having active-halogen or epoxy groups and having an improved state of cure. Still another object of the invention is to provide a vulcanizable composition containing an acrylic elastomer having active-halogen or epoxy groups which produces a vulcanizate having improved aging properties. A still further object of the invention is to provide a vulcanizable composition containing an acrylic elastomer combining improved processing safety with improved cure rate, final state of cure and improved aging of the vulcanizate. Another object of the invention is to provide an improved process for vulcanizing a composition containing an acrylic elastomer.

Figure 2:
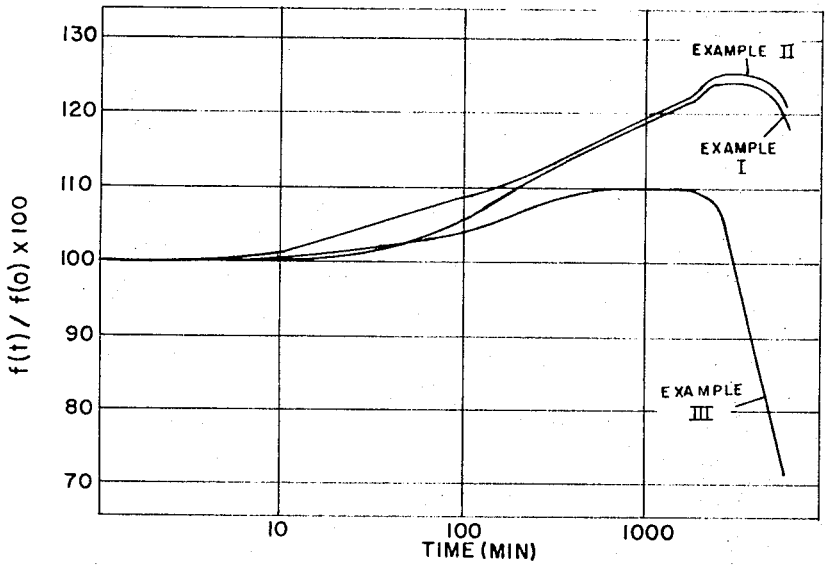
Figure 3:
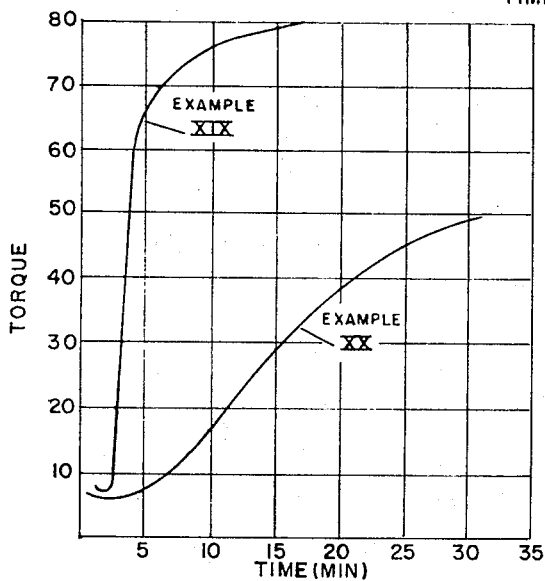

Other objects will become apparent from the following description with reference to the accompanying drawing wherein FIG. 1 compares graphically the thermal stability of embodiments of this invention and of a prior art product as determined by a continuous stress-relaxation technique;

FIG. 2 is a similar graph based on results with intermittent stress-relaxation; and FIG. 3 compares graphically cure rate data obtained with a Monsanto Oscillating Disc Rheometer.

The foregoing objects and others are accomplished in accordance with this invention, generally speaking, by providing a vulcanizable composition containing an acrylic elastomer and a combination of a dithiocarbamic acid derivative and trithiocyanuric acid in an amount sufficient to vulcanize the composition. The invention further contemplates combining trithiocyanuric acid and a dithiocarbamic acid derivative with 2,2'-dithio-bis(benzothiazole) to provide a vulcanizing system with improved processing safety.

It has been found that although neither trithiocyanuric acid alone nor a dithiocarbamic acid derivative alone is effective for vulcanizing an acrylic elastomer having active-halogen or epoxy vulcanization sites, a combination of the two provides a composition which will cure at a more rapid rate than prior art compositions and will also have a high-state of cure. Moreover, the resulting vulcanizate has improved aging properties.

The invention contemplates broadly all vulcanizable compositions containing any acrylic elastomer having either active-halogen or epoxy groups including those elastomers disclosed, for example, in U.S. Pat. Nos. 3,201,373 and 3,312,677. More specifically, the invention contemplates acrylic elastomers prepared by polymerizing alkyl acrylates and alkoxyalkyl acrylates, for example, ethyl acrylate, with an epoxy-containing comonomer such as glycidyl methacrylate or glycidyl acrylate and various chlorine or bromine containing copolymers such as, for example, a 95/5 copolymer of ethyl acrylate and chloroethyl vinyl ether. The elastomer may contain both halogen and epoxy vulcanizing sites.

Any suitable dithiocarbamic acid derivative can be used in combination with trithiocyanuric acid in preparing the novel composition provided by this invention. Any suitable thiuram sulfide having the following formula

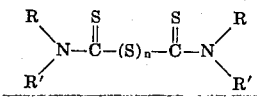

wherein R and R' are alkyl, aralkyl, cycloalkyl or heterocyclic when R and R' are joined together; and n is an integer of from one to six may be used. Preferably, R and R' each have from one to 12 carbon atoms.

Any suitable metal dithiocarbamates having the following formula may be used

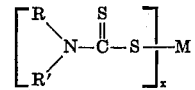

wherein R and R' are alkyl, aralkyl, cycloalkyl or heterocyclic when R and R' are joined to form a ring; x is an integer of from one to three and M is a metal such as, for example, zinc, copper, cadmium, lead, bismuth, iron, cobalt, manganese, tellurium or selenium. Preferably, R and R' each contain from one to 12 carbon atoms.

Typical examples of thiuram sulfides of the above formula are: tetramethyl thiuram monosulfide; tetramethyl thiuram disulfide; tetraethyl thiuram monosulfide; tetraethyl thiuram disulfide; tetrabutyl thiuram monosulfide; tetrabutyl thiuram disulfide; dipentamethylene thiuram tetrasulfide; bis(morpholinothiocarbonyl)disulfide; cyclohexamethylene thiuram disulfide; tetradodecyl thiuram monosulfide and the like.

Typical examples of suitable metal dithiocarbamates include zinc dimethyldithiocarbamate; zinc diethyldithiocarbamate; zinc dibenzyldithiocarbamate; zinc pentamethylene dithiocarbamate; copper dimethyldithiocarbamate; cadmium diethyldithiocarbamate; lead dimethyldithiocarbamate; bismuth dimethyldithiocarbamate; iron dibenzyldithiocarbamate; tellurium diethyldithiocarbamate; selenium dimethyldithiocarbamate; zinc dicyclohexyldithiocarbamate; zinc didodecyldithiocarbamate and the like.

Best results have been obtained so far with compositions containing tetramethyl thiuram monosulfide so this is the preferred thiuram sulfide. Lead dimethyldithiocarbamate is one of the preferred metal dithiocarbamates because it provides a fast rate of cure and a high-state of cure. Copper dimethyldithiocarbamate is also one of the preferred metal dithiocarbamates because of the improved scorch protection in the vulcanizable composition. When using lead dimethyldithiocarbamate, it is advisable to include 2,2'-dithio-bis(benzothiazole) in vulcanizable compositions requiring maximum scorch protection.

The amount of trithiocyanuric acid used can be any amount which will provide a vulcanizable composition. Usually, the amount will be within the range of from about twenty-five hundredths part to about five parts by weight thereof per 100 parts of elastomer in the composition. With most compositions containing an acrylic elastomer, best results are obtained with from about twenty-five hundredths part to about three parts trithiocyanuric acid per 100 parts elastomer so an amount within this range is preferred.

The amount of dithiocarbamic acid derivative likewise can be any amount which will provide a vulcanizable composition but will usually be from about twenty-five hundredths part to about five parts by weight per 100 parts elastomer in the composition. It is preferred to use from about five-tenths to about three parts of the dithiocarbamate derivative per 100 parts elastomer. When 2,2'-dithio-bis(benzothiazole) is combined with trithiocyanuric acid and a dithiocarbamate derivative in the vulcanizable composition, it is preferably used in an amount of from about one-tenth to about three parts by weight per 100 parts of elastomer.

The vulcanizable composition provided by this invention is prepared by conventional compounding techniques. The various ingredients of the composition may be mixed together on a two-roll mill or in a Banbury mixer. The vulcanizable composition, in addition to the accelerator system provided by the invention, may include the conventional carbon blacks, stearic acid, fillers, antioxidants and similar materials.

In order to illustrate embodiments of the invention, a masterbatch is prepared by mixing in a Banbury mixer about 100 parts by weight of an acrylic elastomer prepared from 95 percent by weight ethylacrylate and 5 percent vinyl chloroacetate, about one part by weight of stearic acid, about 60 parts by weight of carbon black and about two parts by weight of phenyl-$\beta$- naphthylamine until a substantially uniform mixture is obtained. The masterbatch is divided into portions and used in the following examples.

EXAMPLE I

About 163 parts by weight of the masterbatch prepared as described above are milled on a two-roll rubber mill with about one part copper dimethyldithiocarbamate and about one part trithiocyanuric acid about 15 minutes or until a substantially uniform mixture is obtained.

EXAMPLE II

Example I is repeated except about one part by weight lead dimethyldithiocarbamate is substituted for the copper dimethyldithiocarbamate.

EXAMPLE III

Example I is repeated except about three-tenths part by weight sulfur and about three and five-tenths parts sodium oleate are substituted for the copper dimethyldithiocarbamate and trithiocyanuric acid.

Physical tests are made on the products of examples I, II and III after compression molding and a 5 minute cure at 165° C. with the following results:

| Properties | I | II | III |
|---|---|---|---|
| Tensile, p.s.i. | 1,400 | 1,555 | 1,390 |
| Elongation, % | 315 | 235 | 330 |
| Modulus, 100%, p.s.i. | 675 | 970 | 580 |
| Hardness, Shore A | 70 | 67 | 65 |
| Properties After Post Curing 16 hrs./ 150° C. | | | |
| Tensile, p.s.i. | 1,810 | 2,175 | 1,790 |
| Elongation, % | 165 | 150 | 180 |
| Modulus, 100%, p.s.i. | 1,210 | 1,550 | 1,075 |
| Hardness, Shore A | 77 | 80 | 74 |
| Mooney Scorch 330° F. | | | |
| $t_s$, minutes | 2.4 | 1.0 | 1.5 |
| $t_{\Delta 30}$, minutes | 0.7 | 0.4 | 0.9 |
| Properties After Aging 70 hrs./176° C. | | | |
| Tensile change, % | 0 | −12 | −19 |
| Elongation change, % | +6 | 0 | +35 |
| Hardness change, points | +5 | +3 | +1 |

Comparison of the 100 percent modulus values indicates that the vulcanization system of this invention reaches a higher state of cure in the same time over the combination of example III. These data also indicate less change in physical properties upon aging of the vulcanizates of examples I and II.

The thermal stability of cured elastomers prepared from the compositions of examples I, II and III is determined on a six-channel, autographic stress-relaxometer. This instrument has load sensing elements, a means for extending and maintaining a test sample at a constant elongation and a circulating oven. The oven is maintained at a temperature of about 176.6±0.25° C. The samples are extended 10 percent ±0.5 percent.

A sample of cured elastomer from each of examples I, II and III is extended 10 percent on the above instrument and held in this extended condition. Decrease in modulus is continuously recorded. Data relating to the relative thermal stability is obtained from plots of $f(t)/f(0)$ as the ordinate versus log time as the abscissa, where $f(t)$ and $f(0)$ are the forces at time $t$ and $t=0$, respectively, required to maintain the sample at the 10 percent extension.

The data are shown in FIG. 1 as $T_{36.8}$ which represents the time required for the sample to degrade to a value equal to 36.8 percent of the initial stresses. The curves in FIG. 1 show that the cured elastomer of example III degrades to 36.8 percent of the initial stresses after 1,300 minutes while those of examples I and II require more than 6,000 minutes to degrade to the same extent. These results indicate thermal degradation due to chain scission is greater in the sample of example III than either of the other two samples.

Samples of cured elastomer from the compositions of examples I, II and III are also compared on the apparatus described above by periodically extending them 10 percent and returning them to rest. Modulus values are determined periodically and plotted in FIG. 2 in the same way as described with respect to FIG. 1. These data indicate the combined effect of cross-linking and chain scission of the samples.

As shown in FIG. 2, the cured elastomer prepared from the composition of example III loses modulus rapidly after repeated stressing and becomes soft and sticky. Note the rapid degradation after 2,000 minutes. With the cured product prepared from the compositions of examples I and II, some cross-linking is apparent with increase in modulus and brittleness but these products are more resistant to degradation than that of example III. The cured elastomers prepared from the compositions of examples I and II are still flexible at the end of the test whereas acrylic elastomers cured with sulfur and sodium oleate are brittle and snap.

EXAMPLE IV

Example I is repeated except about one part by weight lead dimethyldithiocarbamate alone is used instead of copper dimethyldithiocarbamate and trithiocyanuric acid.

EXAMPLE V

Example I is repeated except that about one part by weight trithiocyanuric acid is used alone.

The results obtained in a Mooney Scorch test at 330° F. on the compositions of examples IV and V at 165° C. for 5 minutes are as follows:

| | IV | V |
|---|---|---|
| $t_s$, minutes | 8.5 | 27.5 |
| $t_{\Delta 30}$, minutes | 3.7 | |

A comparison of the foregoing results with those obtained in similar tests on the product of example II illustrates the improved cure rate ($t_{\Delta 30}$) obtained with the vulcanization system of this invention over that with either of the two components thereof alone. The $t_5$ Mooney Scorch result of example V indicates that the rate of cure is much too slow to be practical for use in a commercial process when trithiocyanuric acid alone is used.

EXAMPLE VI

Example II is repeated except that one and thirty-five hundredths parts by weight lead dimethyldithiocarbamate, one part trithiocyanuric acid and thirty-five hundredths part 2,2'-dithio-bis(benzothiazole) are used.

EXAMPLE VII

Example II is repeated except one and seven-tenths parts by weight lead dimethyldithiocarbamate, one part trithiocyanuric acid and seven-tenths part by weight 2,2'-dithio-bis(benzothiazole) are used.

A Mooney Scorch test is made at 250° F. on elastomers prepared by compression molding and curing a sample of the composition of examples II, VI and VII for 8 minutes at 165° C. The results of these tests and the physical properties are as follows:

|  | II | VI | VII |
|---|---|---|---|
| Mooney Scorch |  |  |  |
| $t_s$, minutes | 12.0 | 15.0 | 18.5 |
| Properties |  |  |  |
| Tensile, p.s.i. | 1,590 | 1,545 | 1,560 |
| Modulus, 100% p.s.i. | 1,035 | 980 | 1,040 |
| Elongation, % | 205 | 215 | 215 |
| Hardness, Shore A | 75 | 71 | 75 |
| Compression set: Method B, ASTM 0D–395 : 70 hrs./150° C. |  |  |  |
| % set | 31.2 | 28.8 | 25.2 |

Comparison of the Mooney Scorch results demonstrates that improvement is obtained when 2,2'-dithio-bis(benzothiazole) is used in combination with the accelerator combination of this invention. Comparison of the physical test data on examples VI and VII with those on example II indicates that the 2,2'-dithio-bis(benzothiazole) does not adversely affect the physical properties of the cured elastomer.

EXAMPLE VIII

Example I is repeated except about one part zinc diethyldithiocarbamate is substituted for copper dimethyldithiocarbamate. The Mooney Scorch and physical properties are:

| Mooney Scorch |  |
|---|---|
| T° F. | 290 |
| $t_s$, minutes | 1.0 |
| $t_{\Delta 30}$, minutes | 1.0 |
| Oscillating Disc Rheometer |  |
| T° F. | 330 |
| Torque after 5' | 111 |
| (inch pounds) 10' | 168 |
| 15' | 173 |
| Properties |  |
| Cure, minutes T° F. | 10'/330 |
| Tensile, p.s.i. | 1,715 |
| Elongation, % | 155 |
| Modulus, 100%, p.s.i. | 1,190 |
| Hardness, Shore A | 71 |

EXAMPLE IX

Example I is repeated except about one part bismuth dimethyldithiocarbamate is substituted for copper dimethyldithiocarbamate. The physical properties are:

| Oscillating Disc Rheometer |  |
|---|---|
| T° F. | 330 |
| Torque after 5' | 83 |
| (inch pounds) 10' | 105 |
| 15' | 112 |
| 20' | 116 |
| Properties |  |
| Cure, minutes/T° F. | 10'/330 |
| Tensile, p.s.i. | 1,695 |
| Elongation, % | 230 |
| Modulus, 100%, p.s.i. | 905 |
| Hardness, Shore A | 70 |

EXAMPLE X

Example I is repeated except about one part zinc dibutyldithiocarbamate is substituted for copper dimethyldithiocarbamate. The physical properties are:

| Oscillating Disc Rheometer |  |
|---|---|
| T° F. | 330 |
| Torque after 5' | 42 |
| (inch pounds) 10' | 116 |
| 15' | 131 |
| 20' | 135 |
| Properties |  |
| Cure, minutes/T° F. | 10'/330 |
| Tensile, p.s.i. | 1,500 |
| Elongation, % | 150 |
| Modulus, 100%, p.s.i. | 1,140 |
| Hardness, Shore A | 79 |

EXAMPLE IX

Example I is repeated except about one part zinc dibenzyldithiocarbamate is substituted for copper dimethyldithiocarbamate. The physical properties are:

| Oscillating Disc Rheometer |  |
|---|---|
| T° F. | 330 |
| Torque after 5' | 19 |
| (inch pounds) 10' | 47 |
| 15' | 74 |
| 20' | 91 |
| Properties |  |
| Cure, minutes/T° F. | 10'/330 |
| Tensile, p.s.i. | 1,490 |
| Elongation, % | 190 |
| Modulus, 100%, p.s.i. | 880 |
| Hardness, Shore A | 79 |

EXAMPLE XII

Example I is repeated except about one part zinc pentamethylenedithiocarbamate is substituted for copper dimethyldithiocarbamate. The Mooney Scorch and physical properties are:

| Mooney Scorch |  |
|---|---|
| T° F. | 330 |
| $t_s$, minutes | 0.6 |
| $t_{\Delta 30}$, minutes | 0.6 |
| Properties |  |
| Cure, minutes/T° F. | 10'/330 |

| | |
|---|---|
| Tensile, p.s.i. | 1,795 |
| Elongation, % | 150 |
| Modulus, 100%, p.s.i. | 1,410 |
| Hardness, Shor A | 77 |

EXAMPLE XIII

Example I is repeated except about one part cadmium diethyldithiocarbamate is substituted for copper dimethyldithiocarbamate. The Mooney Scorch and physical properties are:

Mooney Scorch

| | |
|---|---|
| T° F. | 330 |
| $t_s$, minutes | 0.8 |
| $t_{\Delta 30}$, minutes | 0.4 |

Properties

| | |
|---|---|
| Cure, minutes/T° F. | 25'/330 |
| Tensile, p.s.i. | 1,575 |
| Elongation, % | 200 |
| Modulus, 100%, p.s.i. | 1,125 |
| Hardness, Shore A | 73 |

EXAMPLE XIV

Example I is repeated except about one part tellurium diethyldithiocarbamate is substituted for copper dimethyldithiocarbamate. The physical properties are:

Properties

| | |
|---|---|
| Cure, minutes/T° F. | 8'/330 |
| Tensile, p.s.i. | 1,500 |
| Elongation, % | 255 |
| Modulus, 100%, p.s.i. | 800 |
| Hardness, Shore A | 82 |

EXAMPLE XV

Example I is repeated except about one part iron dimethyldithiocarbamate is substituted for copper dimethyldithiocarbamate. The Mooney Scorch and physical properties are:

Mooney Scorch

| | |
|---|---|
| T° F. | 330 |
| $t_s$, minutes | 0.9 |
| $t_{\Delta 30}$, minutes | 0.4 |

Properties

| | |
|---|---|
| Cure, minutes/T° F. | 8'/330 |
| Tensile, p.s.i. | 1,780 |
| Elongation, % | 175 |
| Modulus, 100%, p.s.i. | 1,310 |
| Hardness, Shore A | 75 |

EXAMPLE XVI

Example I is repeated except about one and five-tenths parts tetramethyl thiuram disulfide is substituted for copper dimethyldithiocarbamate. The physical properties are:

Oscillating Disc Rheometer

| | |
|---|---|
| T° F. | 330 |
| Torque after 5' | 85 |
| (inch pounds) 10' | 94 |
| 15' | 100 |
| 20' | 104 |

EXAMPLE XVII

Example II is repeated except one and five-tenths parts lead dimethyldithiocarbamate are used.

The composition prepared in example III and the composition of example XVII are cured for 8 minutes at 330° F. The following test results are obtained:

| | XVII | III |
|---|---|---|
| Physical properties | | |
| Tensile, p.s.i. | 1,915 | 1,300 |
| Elongation, % | 125 | 380 |
| Modulus, 100%, p.s.i. | 1,775 | 495 |
| Shore A hardness | 75 | 66 |

Comparison of these results indicates that a product prepared in accordance with this invention is fully cured after 8 minutes at 330° F. but the product of example III using the prior art soap and sulfur system has reached only a low-state of cure.

EXAMPLE XVIII

A vulcanizable composition is prepared by mixing in a Banbury mixer about 100 parts of an elastomer having the composition of 98 percent ethylacrylate and 2 percent glycidyl acrylate, about one part stearic acid, about two parts phenyl-β-naphthylene, about 60 parts carbon black. About one part trithiocyanuric acid and about one and five-tenths parts lead dimethyldithiocarbamate are then mixed on a two-roll rubber mill with the mixture obtained in the Banbury mixer.

The following physical test data is obtained on the product after curing for 15 minutes at 330° F.:

Properties

| | |
|---|---|
| Tensile, p.s.i. | 1,525 |
| Elongation, % | 275 |
| Modulus, 100%, p.s.i. | 705 |
| Shore A hardness | 70 |
| Oscillating Disc Rheometer 330° F. | |
| Torque after 5' | 49 |
| 10' | 52 |
| 15' | 53 |

The results obtained with the Theometer indicate a relatively rapid cure rate when the combined accelerator system of this invention is used with an epoxy-containing acrylate elastomer. It should be noted that the cure rate has leveled off after about 10 minutes at 330° F.

A masterbatch is prepared by mixing a Banbury mixer about 100 parts of an elastomer having the composition of 95 percent ethylacrylate-butylacrylate (82–18 percent) and 5 percent vinyl chloroacetate, about two parts stearic acid, about two parts N,N'-di-β-naphthyl-para-phenylene diamine and about 60 parts carbon black.

EXAMPLE XIX

A portion of the immediately foregoing masterbatch is mixed on a two-roll rubber mill with about two parts lead dimethyldithiocarbamate, about one part trithiocyanuric acid and about one part 2,2'-dithio-bis(benzothiazole) per 100 parts of elastomer in the masterbatch.

EXAMPLE XX

Example XVIII is repeated except that about three and five-tenths parts sodium oleate and about three-tenths part sulfur are substituted for the lead dimethyldithiocarbamate, trithiocyanuric acid and 2,2'-dithio-bis(benzothiazole).

The compositions of examples XIX and XX are cured for about 8 minutes at 165° C. and tested with the following results:

|  | XIX | XX |
| --- | --- | --- |
| Tensile, p.s.i. | 1,450 | 1,350 |
| Modulus, 100%, p.s.i. | 1,340 | 920 |
| Elongation, % | 140 | 190 |
| Hardness, Shore A | 78 | 72 |
| Physical properties after post-curing 16 hrs/150° C. | | |
| Tensile, p.s.i. | 1,860 | 1,490 |
| Modulus, 100%, p.s.i. | | 1,170 |
| Elongation, % | 85 | 150 |
| Hardness, Shore A | 85 | 78 |

Comparison of the foregoing results again illustrates that the vulcanizable composition provided by this invention reaches a higher state of cure than that of the prior art soap and sulfur system. The curves of torque versus time at 330° F. with an oscillating disc Rheometer have been plotted in FIG. 3. The curves indicate that the composition of example XIX obtains its maximum state of cure very rapidly whereas that of example XX is very slow. After 16 hours at 150° C., the composition of example XIX attains a significantly higher tensile strength than that of example XX.

A masterbatch is prepared by mixing in a Banbury mixer about 200 parts by weight of a 95 percent ethylacrylate and 5 percent vinyl chloroacetate elastomer, about two parts stearic acid and about 120 parts carbon black.

EXAMPLE XXI

About one part by weight trithiocyanuric acid, about one part 2,2'-dithio-bis(benzothiazole), about two parts phenyl-$\beta$-naphthylamine and about two parts lead dimethyldithiocarbamate are mixed on a two-roll rubber mill with about 161 parts of the immediately above masterbatch.

EXAMPLE XXII

About 2.5 parts by weight ammonium adipate, about three parts sodium sulfate derivative of 2-ethyl-1-hexanol and about two parts di-$\beta$-naphthyl-$p$-phenylene diamine are mixed on a two-roll rubber mill with about 161 parts of the above masterbatch.

The Mooney Scorch at 250° F. and at 330° F. of the composition of examples XXI and XXII is:

|  | XXI | XXII |
| --- | --- | --- |
| $t_5$, minutes (250° F.) | 18 | 26.5 |
| $t_5$, minutes (330° F.) | 1.6 | 2.3 |
| $t_{\Delta 30}$, minutes (330° F.) | 0.6 | 1.3 |

After curing for 8 minutes at about 330°–340° F. and postcuring 16 hours at 150° C. the compositions have the following physical properties:

|  | XXI | XXII |
| --- | --- | --- |
| Tensile, p.s.i. | 1,790 | 1,665 |
| Elongation, % | 185 | 210 |
| Modulus, 100% | 1,110 | 845 |
| Shore A hardness | 78 | 79 |

It is apparent from the above data that the composition of the invention as represented by example XXI cures faster, provides adequate processing safety and reaches a higher state of cure than that of the prior art represented by example XXII.

EXAMPLE XXIII

About 100 parts by weight of the elastomer used in example I, about one part stearic acid and about 60 parts carbon black are mixed together in a Banbury mixer. The resulting mixture is then mixed on a two-roll rubber mill with about two parts phenyl-$\beta$-naphthylamine, about one part copper bis(morpholinothiocarbonyl)disulfide and about one part trithiocyanuric acid.

The Mooney Scorch at 280° F. ($t_5$, minutes) is 13.5 and the cure rate as determined with an Oscillating Disc Rheometer at 330° F. is five.

EXAMPLE XXIV

About 100 parts of an elastomer of the composition of 95 percent ethylacrylate and 5 percent vinyl chloroacetate, about one part stearic acid and about 60 parts carbon black are mixed together in a Banbury mixer. The resulting mixture is then mixed with about two parts phenyl-$\beta$-naphthylamine, about one part trithiocyanuric acid and about 1.5 parts tetramethyl thiuram monosulfide on a two-roll rubber mill.

The following results are obtained in tests on the product:

Oscillating Disc Rheometer at 176.6° C.

| Cure rate | 7.0 |
| --- | --- |
| Torque at 90% of cure, in. lbs. | 46 |
| Time to 90% of cure, minutes | 10 |
| Physical properties: Cured 10 min./165° C. Postcured 16 hrs./150° C. | |
| Tensile, p.s.i. | 1,910 |
| Elongation, % | 165 |
| Modulus, 100 % | 1,270 |
| Shore A hardness | 80 |

Example XXIV is repeated except about one part bis(morpholinothiocarbonyl)disulfide is substituted for tetramethyl thiuram monosulfide.

The following physical test data is obtained on the product:

Oscillating Disc Rheometer at 176.6° C.

| Cure rate | 5.8 |
| --- | --- |
| Torque at 90% of cure, in. lbs. | 25 |
| Time to 90% of cure, minutes | 10 |
| Physical properties: Cured 10 min./165° C. Postcured 16 hrs./150° C. | |
| Tensile, p.s.i. | 1,795 |
| Elongation, % | 190 |
| Modulus, 100% | 1,000 |
| Shore A hardness | 80 |

Although the invention has been described in detail for the purpose of illustration, it is to be understood that this detail is solely for that purpose and that variations can be made by those skilled in the art without departing from the spirit and scope of the invention.

I claim:

1. A vulcanizable composition comprising an acrylic elastomer having active-halogen atoms or epoxy groups, trithiocyanuric acid and a dithiocarbamic acid derivative selected from the group consisting of thiuram sulfide and metal dithiocarbamate.

2. The composition of claim 1 wherein from about 0.25 to about five parts by weight each of trithiocyanuric acid and of a thiuram sulfide or a metal dithiocarbamate per 100 parts elastomer are included in the composition.

3. The composition of claim 1 wherein the dithiocarbamic acid derivative is thiuram sulfide having the formula

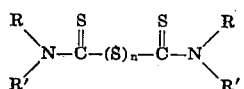

wherein R and R' are alkyl, aralkyl, cycloalkyl or heterocyclic when R and R' are joined together to form a ring and $n$ is an integer of from 1 to 6.

4. The composition of claim 1 wherein the dithiocarbamic acid derivative is zinc, copper, cadmium, lead, bismuth, iron, cobalt, manganese, tellurium or selenium dithiocarbamate.

5. The composition of claim 1 containing 2,2'-dithio-bis(benzothiazole).

6. The composition of claim 5 containing from about 0.1 to about three parts by weight per 100 parts of elastomer of 2,2'-dithio-bis-(benzothiazole).

7. The composition of claim 4 wherein the metal dithiocarbamate is lead dimethyldithiocarbamate.

8. The composition of claim 4 wherein the metal dithiocarbamate is copper dimethyldithiocarbamate.

9. The composition of claim 1 wherein the dithiocarbamic acid derivative is tetramethylthiuram monosulfide.

* * * * *

UNITED STATES PATENT OFFICE
CERTIFICATE OF CORRECTION

Patent No. 3,622,547          Dated November 23, 1971

Inventor(s)    Nicholas P. Ermidis

It is certified that error appears in the above-identified patent and that said Letters Patent are hereby corrected as shown below:

Column 4, line 7, "10 percent ± 0.5 percent" should read --10 percent ± 0.05 percent--.

Column 5, line 31, after "ASTM" "OD" should read -- #D--.

Column 10, line 45, insert the heading --EXAMPLE XXV--.

Signed and sealed this 9th day of May 1972.

(SEAL)
Attest:

EDWARD M. FLETCHER, JR.        ROBERT GOTTSCHALK
Attesting Officer              Commissioner of Patents